(No Model.)

G. H. MERRICK.
BUNG AND BUSHING.

No. 520,372. Patented May 22, 1894.

Witnesses,

Inventor,
George H. Merrick
By Dewey & Co.
Attys

UNITED STATES PATENT OFFICE.

GEORGE H. MERRICK, OF SAN FRANCISCO, CALIFORNIA.

BUNG AND BUSHING.

SPECIFICATION forming part of Letters Patent No. 520,372, dated May 22, 1894.

Application filed September 8, 1893. Serial No. 485,082. (No model.)

*To all whom it may concern:*

Be it known that I, GEORGE H. MERRICK, a citizen of the United States, residing in the city and county of San Francisco, State of California, have invented an Improvement in Bungs and Bushings; and I hereby declare the following to be a full, clear, and exact description of the same.

My invention relates to a bung for casks and barrels, and it consists of the constructions and combinations of parts hereinafter described and claimed.

Figure 1:
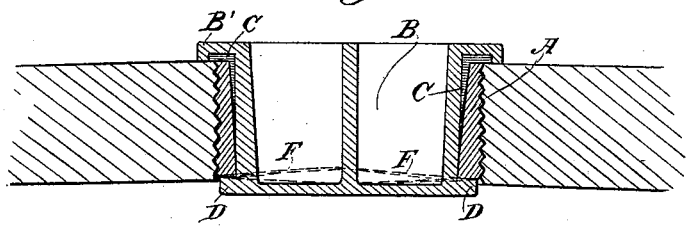
Figure 2:
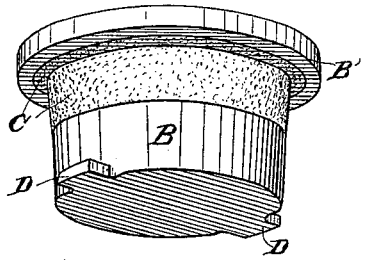
Figure 3:
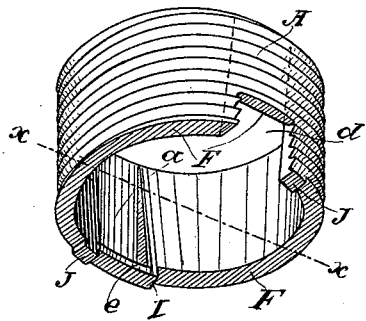

Figure 1 is a section taken through line $x$—$x$ of Fig. 3, showing the bushing and plug in their normal relative position. Fig. 2 is a detail view of the plug. Fig. 3 is a detail view of the bung.

The object of my invention is to provide a bung for barrels and casks, which can be rapidly and hermetically closed, and which may be opened sufficiently to allow gas to escape while preventing the bung from being displaced and lost.

The bushing A is screw-threaded upon the exterior, and adapted to screw into the cask and be fixed firmly therein. The interior of the bushing is made of larger diameter at the outer end, and converges toward the inner end as shown. That portion of the bushing through which the locking lugs of the bung or plug are to pass when the bung is inserted is grooved out for a space sufficient to allow the lugs to freely pass, these grooves $a$ having their largest diameter sufficient to allow the lugs upon the bung to pass freely.

B is the bung having a flange B' extending around its outer end of sufficient diameter to fit over the outer end of the bushing. Around the bung and within this flange is an elastic packing C made of such shape that it will fit the tapering portion of the interior of the bushing as soon as the bung is inserted, and thus form a tight joint before the bung is locked in place.

D D are lugs projecting upon opposite sides of the bung, and when the bung is to be introduced into the bushing, these lugs are brought in line with the grooves $a$ which are made in opposite sides of the bung as before described. The inner end of the bushing is cut away upon one side in line with the groove or channel $a$ so as to leave a space or opening $d$ upon this side, and as the bung is made tapering and passes loosely into the bushing until it is seated, this opening allows the lug upon that side to pass out through the side of the bushing before the bung reaches its seat.

Upon the opposite side of the bushing, in line with the groove or channel $a$, and just at the inner end, is made an inwardly projecting lip $e$, and the movement of the bung which causes the lug upon the opposite side to pass outward through the channel $d$, allows the lug upon the side adjacent to this lip or ledge to pass the ledge when the bung is introduced. The bung then seats itself upon the packing around the annular exterior flange, and this centers it within the bushing so that the lug adjacent to the ledge projects over the ledge, and the bung is then turned until the lugs pass over the inner end of the bushing where the latter is of a smaller diameter than the exterior diameter of the lugs, and this prevents them from being drawn inwardly and the bung removed. The inner end of the bushing is made with inclines upon its opposite sides, as shown at F, and the lugs moving over these inclines draw the bung tightly into its position in the bushing and lock it firmly in place.

In filling casks with lager beer which is taken from the cold storage containing vessels, and run into the cask through a hose, it is necessary to close the cask the instant it is filled to prevent the escape of gas which will commence at once, if the cask be not properly closed. This closure is usually effected by means of the wooden bung which is driven with a mallet the instant the cask is filled. Difficulty is experienced in closing these casks in time, when the ordinary screw bung is employed, but by reason of the tapering bushing, and the elastic packing ring which surrounds the plug of my bung and fits the tapering interior of the bushing, it acts in the same manner as the wooden plug and closes the cask hermetically the instant it is introduced and before any time is taken to turn it. It can then be turned at comparative leisure until the lugs have passed over the inclined inner end of the bushing and locked it firmly in place.

This bung is equally available for use in casks and barrels for what is known as steam beer, which is used under pressure of carbonic acid gas generated in the beer. When the bung is used for this class of beer, it is usually loosened after the cask is set up, in order to allow a portion of the gas to escape, so that when the beer is drawn from the faucet, it will not carry with it too much gas and foam. When the bungs are thus loosened, they are apt to become lost, and in my device I have constructed the inclines of the bushing with stops as shown at I against which one of the lugs strikes when the bung is turned sufficiently to allow the gas to escape and this prevents it being turned so far as to be entirely withdrawn. When it is desired to entirely withdraw the bung, it is done by pressing the bung in until the lug passes this stop, when it can then be turned to the point where it may be withdrawn in the same manner that it was introduced. In order to prevent its being turned too far so as to pass the slots or grooves $a$ through which the lugs may be withdrawn I make another stop J against which the lug will strike at the instant when it is in line with the grooves through which the two lugs pass when the bung is withdrawn.

Having thus described my invention, what I claim as new, and desire to secure by Letters Patent, is—

1. A bushing adapted to be secured within the cask and having a smooth tapering interior surface, a bung adapted to be seated within the bushing and form a tight joint, said bung having oppositely projecting lugs at its inner end of greater exterior diameter than the interior diameter of the inner end of the bushing, longitudinal channels made in the interior end of the bushing with one of said channels opening through the lower side wall thereof above its lower end to allow the lugs to pass through the bushing and inclined surfaces formed upon the inner end of the bushing extending from the channels in opposite directions whereby the lugs are compelled to travel upon the inclines when the bung is turned, and serve to lock the bung in place, substantially as herein described.

2. A bung having outwardly and oppositely projecting lugs upon its inner end, and an elastic tapering washer surrounding its outer end, a bushing adapted to be permanently fitted in the cask having a smooth tapering interior within which the washer of the bung forms a tight joint immediately upon the introduction of the bung into the bushing, channels made longitudinally in opposite sides of the bushing to allow the lugs of the bung to pass through the bushing, an open slot cut through one side of the inner end of the bushing corresponding with one of the lugs to allow the bung to be moved to that side before reaching its seat, and an inwardly projecting lip at the inner end of the opposite channel over which the opposite lug must pass before the bung is seated, inclined surfaces upon the inner end of the bushing of smaller diameter than the exterior diameter of the lugs whereby the latter move over the inclines when the bung is turned and lock it in place, substantially as herein described.

3. The bushing having a tapering interior, a bung adapted to be seated therein, opposite longitudinal channels made in the interior of the bushing to allow the lugs of the bung of larger diameter than the interior of the bushing to pass, inclined surfaces upon the inner end of the bushing over which the lugs pass when the bung is turned, a shoulder formed at the foot of one of the inclines against which the corresponding lug abuts when the bung has been turned back sufficiently to loosen it, said shoulder preventing the bung from turning far enough to be removed, substantially as herein described.

4. A bushing having a tapering interior, a bung adapted to seat therein and form a tight joint and having lugs at the inner end of greater exterior diameter than the interior end of the bushing, longitudinal channels through which the lugs pass when the bung is inserted, inclined faces upon the inner end of the bushing over which the lugs pass when the bung is turned in one direction, and stops I and J by which the lugs are arrested when the bung is turned back, substantially as herein described.

In witness whereof I have hereunto set my hand.

GEORGE H. MERRICK.

Witnesses:
S. H. NOURSE,
WM. F. BOOTH.